United States Patent [19]

Journee

[11] 4,321,725

[45] Mar. 30, 1982

[54] WINDSCREEN WIPER BLADE ASSEMBLY

[75] Inventor: Maurice A. Journee, Reilly, France

[73] Assignee: NEFCO, Division Neiman Industries, Inc., Cadillac, Mich.

[21] Appl. No.: 129,441

[22] Filed: Mar. 11, 1980

[30] Foreign Application Priority Data

Oct. 8, 1979 [FR] France ................................ 79 24950

[51] Int. Cl.³ .............................................. B60S 1/40
[52] U.S. Cl. ................................................. 15/250.32
[58] Field of Search ........................ 15/250.32–250.42

[56] References Cited

U.S. PATENT DOCUMENTS

| | | | |
|---|---|---|---|
| 3,049,743 | 8/1962 | Graczyk et al. | 15/250.32 |
| 3,550,180 | 12/1970 | Arman | 15/250.32 |
| 3,896,519 | 7/1975 | Pankow | 15/250.32 |
| 4,178,651 | 12/1979 | Mayer | 15/250.32 |

FOREIGN PATENT DOCUMENTS

| | | | |
|---|---|---|---|
| 21858 | 10/1956 | Fed. Rep. of Germany | 15/250.32 |
| 1190348 | 4/1965 | Fed. Rep. of Germany | 15/250.32 |
| 2116821 | 7/1972 | France | 15/250.32 |
| 2118202 | 7/1972 | France | 15/250.32 |
| 878164 | 9/1961 | United Kingdom | 15/250.32 |

Primary Examiner—Peter Feldman
Attorney, Agent, or Firm—James C. Wray

[57] ABSTRACT

A windscreen wiper blade is provided with a universal fastening for attachment to a wiper arm. The wiper blade is provided with a transverse bore in which there is lodged a spindle provided with a central constriction with which there cooperates a locking leaf spring fast with the wiper blade and is capable of being pushed down to free the spindle stub. A rider piece is articulated on the said spindle stub. A leaf spring is fixed by its central part to the rider piece and has two elastic arms disposed longitudinally thereon which thrust towards one wall of the rider piece. The rider piece forms at its two extremities a passage for the introduction of the wiper arm extremity between the said wall and the adjacent arm of the leaf spring. One of the elastic arms is equipped with a locking stud while the wall portion facing the other arm is equipped with a window.

5 Claims, 7 Drawing Figures

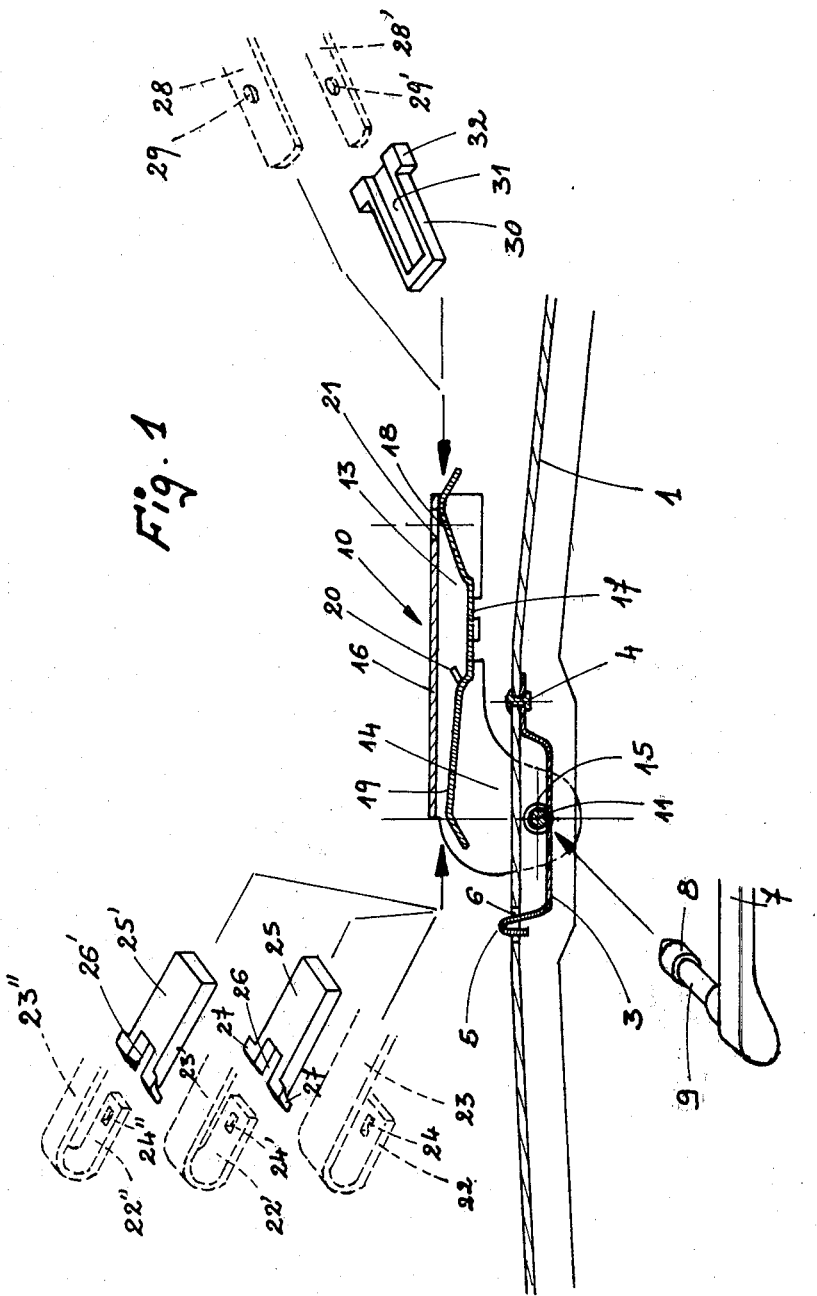

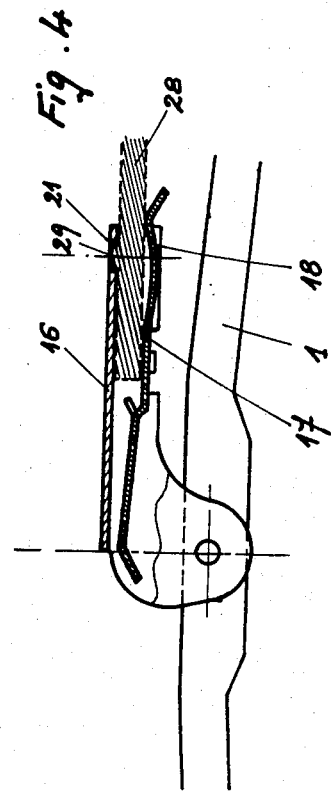
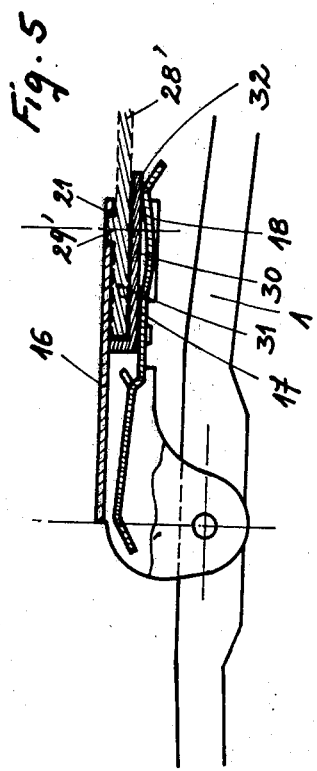
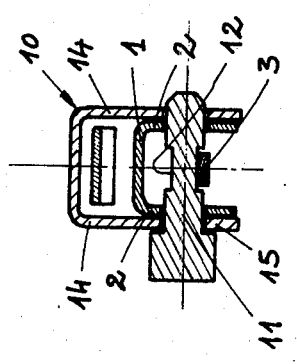
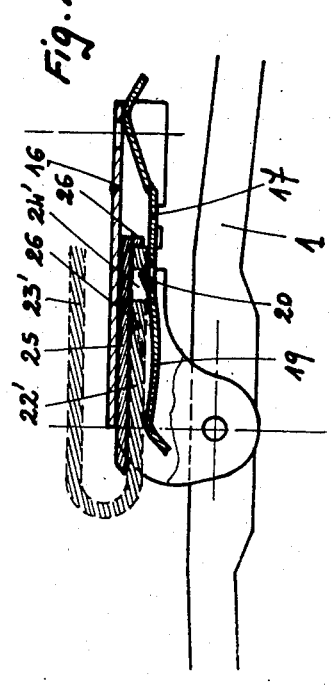
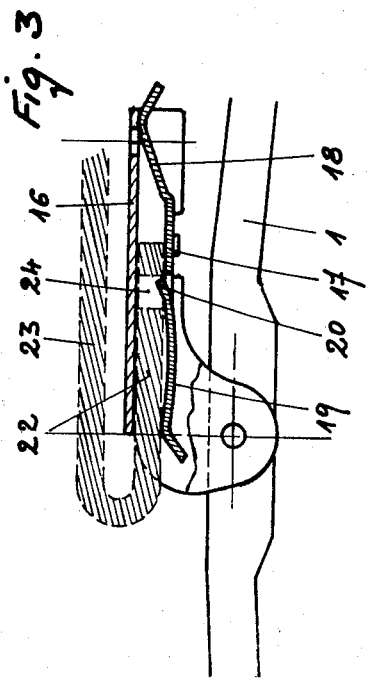
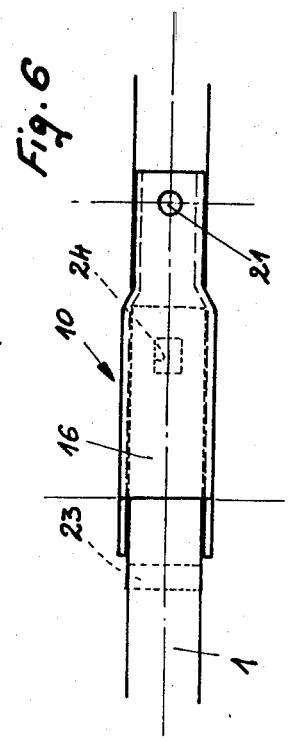

WINDSCREEN WIPER BLADE ASSEMBLY

BACKGROUND OF THE INVENTION

Windscreen wiper blades are fitted detachably on the extremity of a wiper arm and must be replaced periodically in order to ensure good wiping, which is a safety prerequisite. Thus wiper arms are equipped at their extremities with a hook attachment element which co-operates with a complementary element of the wiper blade to permit such replacement. However numerous types of arms exist having different hook attachment systems, so that even on vehicles of the same type it is necessary to provide a replacement wiper blade adapted to the type of arm with which the vehicle was originally equipped.

STATEMENT OF PRIOR ART

To permit adaptation of a wiper blade to arms of various types, it has been proposed to supply the wiper blade with a fastening of a specific type and to fit upon this fastening an intermediate piece adapted to co-operate with a particular arm. While this solution permits of partially resolving the set problem it does not enable adaptation to certain arms and in all cases necessitates a special piece for each arm, which is burdensome and leads to an assembly which is complicated in use.

OBJECT OF THE INVENTION

The present invention aims at obtaining a wiper blade which is adaptable to a large number of windscreen wiper arms, with different dimensions for each of them, using a limited number of accessory parts, these accessory parts being moreover small and thus not bulky, and very easy in use.

SUMMARY OF THE INVENTION

To this end the invention has for object a windscreen wiper blade with universal fastening, characterised in that the blade is equipped with a transverse bore in which there is lodged a spindle equipped with a central constriction with which a locking leaf spring fast with the wiper co-operates, which spring can be pushed back to free the spindle stub, while a rider piece is articulated on the said spindle stub, a leaf spring being fixed by its central part to the rider piece and having two elastic arms disposed longitudinally and thrust towards one wall of the rider piece, the said rider piece forming a passage at its two extremities for the introduction of a windscreen wiper arm end between the said wall and the adjacent arm of the leaf spring, one of the arms being equipped with a locking stud while the wall portion facing the other arm is provided with a window.

The wiper blade according to the invention can receive an arm terminating with a hook provided with a window which co-operates with the locking stud. The wiper blade can equally receive an arm with flat extremity provided with a stud which co-operates with the window formed in the wall of the rider piece. Furthermore by dismantlement of the spindle stub and the rider piece the wiper blade can be fitted on an arm equipped with a transverse spindle stub having a central constriction.

According to a preferred form of embodiment of the invention the wiper blade comprises a plurality of packing pieces which can be interposed between the said wall of the wiper blade and one of the arms of the leaf spring, leaving the locking stud or the window respectively free, each of the packing pieces being equipped with a recess to receive an arm of width less than the arm received by the rider piece in the absence of a packing piece.

BRIEF DESCRIPTION OF DRAWINGS

The invention will be clearly understood on reading of the following description given with reference to the accompanying drawing, wherein:

FIG. 1 is a diagrammatic exploded perspective view, partially in longitudinal section, of a part of a wiper blade according to one example of embodiment of the invention, FIG. 2 is a diagrammatic axial sectional view, partially in elevation, of a part of the wiper blade according to FIG. 1 fitted on a hooked arm, with a packing piece, FIG. 3 is analogous with FIG. 2, the wiper blade being fitted on a hooked arm without packing piece, FIG. 4 is analogous with FIGS. 2 and 3, the wiper blade being fitted on a rectilinear arm with stud, without packing piece, FIG. 5 is analogous with FIG. 4, the arm being fitted through the intermediary of a packing piece, FIG. 6 is a plan view of the wiper blade according to FIG. 3, and FIG. 7 is an axial sectional view of the wiper blade according to FIGS. 1 to 6.

DESCRIPTION OF PREFERRED EMBODIMENT

The actual wiper blade comprises a primary yoke 1 carrying a blade rubber, possibly through the intermediary of secondary yokes. For clarity of the drawing only the central part of the primary yoke has been represented. This part has a cross-section of downwardly open U-form (see FIG. 7). The yoke 1 comprises a transverse bore 2 in each of the two legs of the U, and a leaf spring 3 is interposed between the bores 2. The spring 3, fixed to the upper wall of the yoke 1 by a rivet 4, terminates at the opposite end with a protuberance 5 projecting above the yoke 1 through a hole 6 in the latter. Depression of the protuberance 5 disengages the spring 3 from the space between the bores 2.

In known manner the wiper blade as just described can be fixed to the extremity of an arm 7 provided with a transverse spindle stub 8. The spindle stub 8, which comprises a central constriction 9, is introduced laterally into the bores 2 by depression of the protuberance 5, and after the complete introduction of the spindle stub 8 the liberation of the protuberance 5 elastically brings the leaf spring 3 into the constriction 9. The wiper blade is locked laterally in relation to the arm 7 but can pivot about the spindle stub 8.

In accordance with the invention the wiper blade is equipped with a rider piece 10 fitted on the yoke 1 through the intermediary of a spindle 11 provided with a central constriction 12 which co-operates as above with the leaf spring 3. The rider piece 10 comprises an elongated body 13 connected to two arms 14 each equipped with a hole 15 serving for the passage of the spindle 11.

The body 13 is hollow, for example formed by bending of a metallic sheet likewise comprising the arms 14, and comprises a substantially flat upper wall 16. A leaf spring 17 is fixed at its central part on the lower part of the body 13 and comprises two arms 18 and 19 bent towards the wall 16. A lug 20 protruding towards the wall 16 is formed in the arm 18, for example by cutting out. The wall 16 further comprises a window 21 facing the arm 18..

The turned-over extremity 22 of a known hooked arm 23, provided with a cut-out portion 24, can be introduced between the wall 16 and the arm 19 of the leaf spring 17, the lug 20 locking itself into the cut-out portion 24 (FIG. 3). With a hooked arm 23' of narrower width, a packing piece 25 (FIG. 2) is used having the dimensions of the extremity 22 of the hooked arm 23 and equipped with a downwardly open groove 26 receiving the extremity 22' of the arm 23', the cut-out portion 24' of which again co-operates with the lug 20. The packing piece 25 comprises two lateral protuberances 27 which ensure its positioning in the interior of the body 13. With a still narrower hooked arm 23'', a packing piece 25' (FIG. 1) is used the groove 26' of which is narrower.

The straight extremity of a windscreen wiper arm 28 provided with a stud 29 on its upper face can likewise be introduced between the wall 16 and the arm 18 of the leaf spring 17, the stud 29 lodging in the window 21 (FIG. 4). As previously, with a narrower straight arm 28' a packing piece 30 is used comprising an upwardly open groove 31 equipped with two positioning protuberances 32 (FIGS. 1 and 5). In all cases dismantlement is effected by the converse operations to those of fitting, using a tool if necessary to push down the arms of the leaf spring 17.

I claim:

1. A windscreen wiper blade assembly with universal wiper arm fastening, comprising
   (a) a wiper blade provided with a transverse bore,
   (b) a spindle located in said bore provided with a central constriction,
   (c) a locking leaf spring fast with the wiper blade cooperating with said constriction and capable of being moved to free the spindle,
   (d) a rider piece provided with a wall portion and having two arms extending therefrom articulated on the said spindle,
   (e) a leaf spring being fixed by its central part to the rider piece,
   (f) two arms on said leaf spring disposed longitudinally thereon, each of said arms being resiliently thrust towards said wall portion of the rider piece into a locking position, the said rider piece forming at its two extremities a passage for the introduction of the wiper arm extremity between the said wall portion and the adjacent arm of the leaf spring,
   (g) one of the arms of said leaf spring being equipped with a locking stud adapted to cooperate with a wiper arm of the type provided with a window portion, while the wall portion facing the other arm of said leaf spring is equipped with a window adapted to cooperate with a wiper arm of the type provided with a locking stud.

2. A windscreen wiper blade assembly according to claim 1, wherein a packing piece is provided interposed between the said wall portion and one of the arms of the leaf spring, leaving the locking stud or the window respectively free, said packing piece being equipped with a recess to receive a wiper arm of reduced width.

3. A windscreen wiper assembly according to claim 2, wherein said packing piece includes lateral positioning protuberances.

4. An adaptor for connecting a wiper blade of the type provided with a transverse bore and locking leaf spring to a wiper arm of the type including a locking stud or alternatively a window portion, said adaptor comprising
   a spindle for location in said bore provided with a central constriction adapted to cooperate with said locking leaf spring,
   a rider piece provided with a wall portion and having two arms extending therefrom for articulation on the said spindle,
   a leaf spring being fixed by its central part to the rider piece,
   two arms on said leaf spring disposed longitudinally thereon, each of said arms being resiliently thrust towards said wall portion of the rider piece into a locking position, the said rider piece forming at its two extremities a passage for the introduction of the wiper arm extremity between the said wall portion and the adjacent arm of the leaf spring,
   one of the arms of said leaf spring being equipped with a locking stud adapted to cooperate with the wiper arm of the type provided with the window portion, while the wall portion facing the other arm of said leaf spring is equipped with a window adapted to cooperate with the wiper arm of the type provided with the locking stud.

5. An adaptor according to claim 4, wherein a selectable packing piece is provided for insertion between the wall portion and one arm of said leaf spring to accommodate a wiper arm of reduced width.

* * * * *